United States Patent Office 3,824,177
Patented July 16, 1974

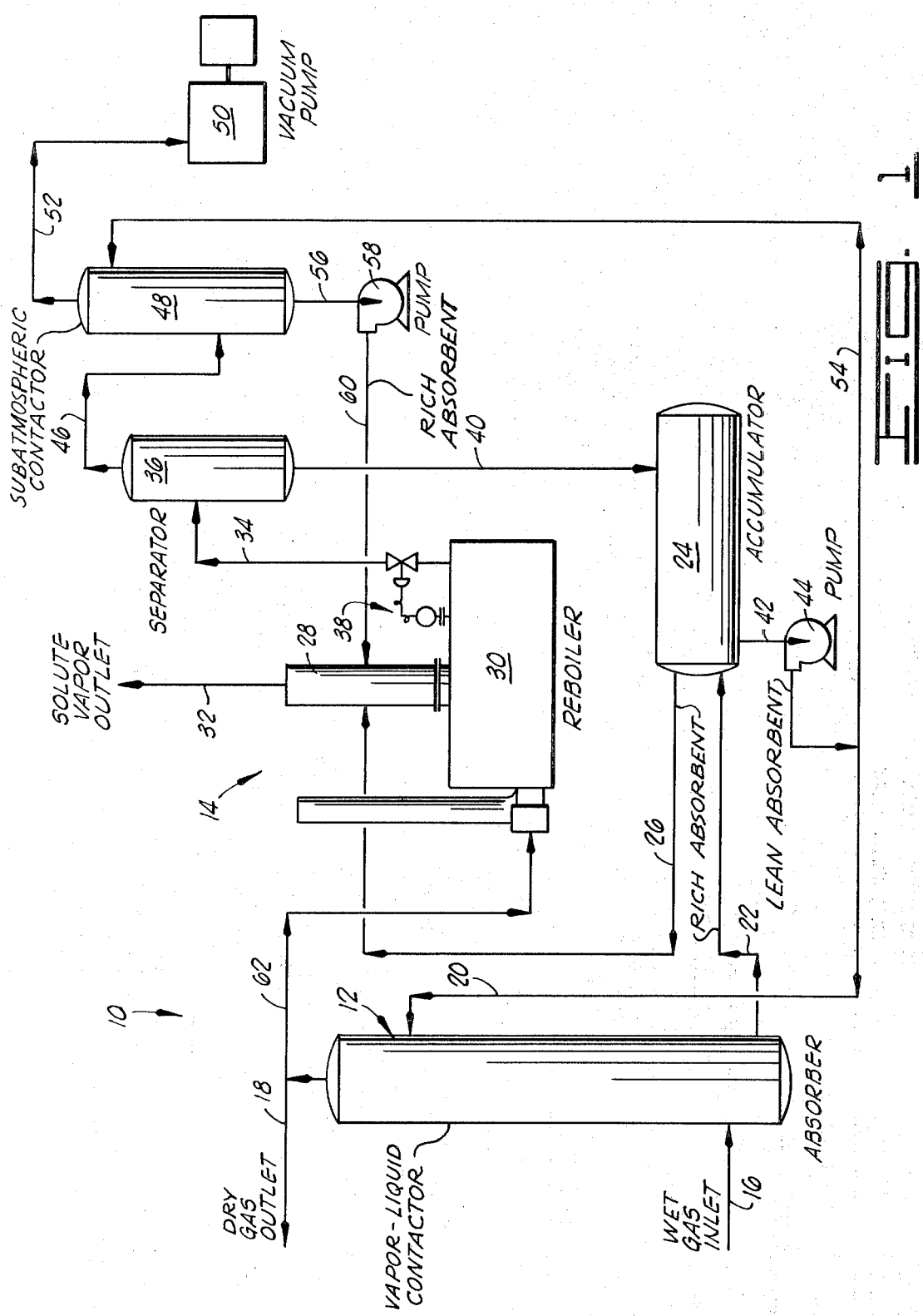

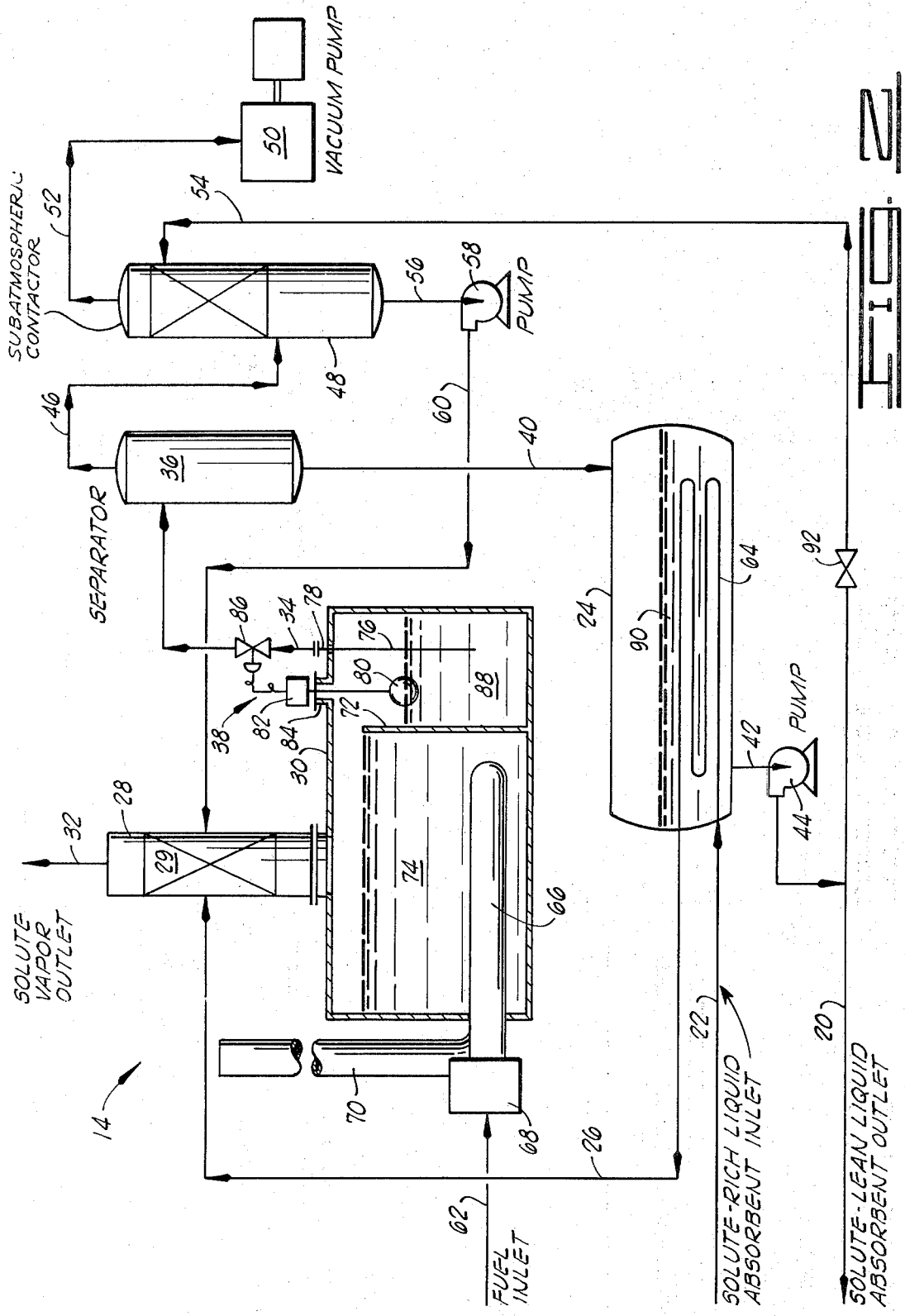

3,824,177
METHOD AND SYSTEM FOR RECONCENTRATING SOLUTE-RICH LIQUID ABSORBENT
Joseph D. Honerkamp and Paul M. Tournoux, Oklahoma City, Okla., assignors to Black, Sivalls & Bryson, Inc., Houston, Tex.
Filed Mar. 26, 1973, Ser. No. 344,768
Int. Cl. B01d 1/00, 3/00, 3/34, 45/00, 47/00, 53/02
U.S. Cl. 203—18                                    13 Claims

ABSTRACT OF THE DISCLOSURE

The present invention relates to an improved method and system for reconcentrating solute-rich liquid absorbent wherein the liquid absorbent is heated at super-atmospheric pressure to vaporize a portion of the solute contained therein and the resultant partially reconcentrated liquid absorbent is subjected to sub-atmospheric pressure so that additional solute contained therein is vaporized and the liquid absorbent is further reconcentrated.

BACKGROUND OF THE INVENTION

1. Field of the Invention

The present invention relates generally to methods and systems for reconcentrating liquid absorbent, and more particularly, but not by way of limitation, to methods and systems for reconcentrating solute-rich liquid absorbent wherein the liquid absorbent is regenerated by the application of heat and sub-atmospheric pressure thereto.

2. Description of the Prior Art

Many various methods and systems for reconcentrating solute-rich liquid absorbents have been developed. For example, in the dehydrating of gas streams, a lean liquid absorbent such as an aqueous solution of glycol is commonly used to absorb water vapor contained in the gas stream. The resulting stream of water-rich glycol is introduced into a heated reboiler wherein a major portion of the water is vaporized and separated to produce a recencentrated or lean glycol solution for recirculation into contact with the gas stream. In drying gas streams such as natural gas, the liquid absorbent most commonly used is an aqueous solution of triethylene glycol. However, aqueous solutions of ethylene glycol, diethylene glycol, tetraethylene glycol and other liquids or solutions which absorb water may also be used.

In addition to the dehydration of gas streams, liquid absorbents are utilized in a variety of other industrial applications for absorbing solutes both from liquid and gas streams. The resulting solute-rich liquid absorbent streams are regenerated by a variety of methods, the most common of which is by the application of heat so that the solute contained in the liquid absorbent is vaporized. Generally, the stream of solute-rich liquid absorbent is introduced into a reboiler wherein it is heated to vaporize at least a portion of solute contained therein. The vaporized solute is removed from the reboiler and the resulting reconcentrated liquid absorbent is cooled and reused for absorbing additional solute.

In the reconcentration of solute-rich liquid absorbent by the application of heat, it is often advantageous to carry out the reconcentration at reduced pressures. That is, if the heating of the liquid absorbent is accomplished at sub-atmospheric pressure, vaporization of the solute takes place more readily than at higher pressures and less heat is required to achieve the desired degree of liquid absorbent purity. In the use of temperature sensitive liquid absorbents, i.e., liquid absorbents that decompose at elevated temperatures, reconcentration at sub-atmospheric pressure is particularly advantageous due to the ability to obtain high levels of reconcentration at relatively low temperatures without decomposition of the liquid absorbent. The term "sub-atmospheric pressure" is used herein to mean a pressure below atmospheric pressure. The term "super-atmospheric pressure," is used herein to mean a pressure equal to or higher than atmospheric pressure.

Methods and systems for reconcentrating solute-rich liquid absorbent at sub-atmospheric pressures have been developed and used heretofore. These systems have generally included a heated reboiler and a still column, with both the reboiler and still column being subjected to vacuum conditions. Further, in the operation of such systems, a portion of the vaporized solute is condensed and returned to the still column as reflux in order to obtain adequate separation of vaporized solute from vaporized absorbent. The equipment required for such vacuum reconcentration systems is elaborate and practically all of the equipment must be designed to withstand vacuum conditions making the systems expensive to install and operate. As a result, liquid absorbent reconcentration systems utilizing subatmospheric pressure as a means for achieving high levels of reconcentration have generally been found to be uneconomical as compared to liquid absorbent reconcentration systems wherein the reconcentration process is carried out at super-atmospheric pressure.

By the present invention an improved method and system for reconcentrating solute-rich liquid absorbent is provided wherein the liquid absorbent is subjected to sub-atmospheric pressure but elaborate and expensive equipment is not required.

SUMMARY OF THE INVENTION

The present invention relates to a method of reconcentrating a stream of solute-rich liquid absorbent comprising the steps of heating the stream of solute-rich absorbent at super-atmospheric pressure to vaporize a portion of the solute contained therein, separating the vaporized solute from the liquid absorbent, subjecting the resultant stream of partially reconcentated liquid absorbent to sub-atmospheric pressure so that additional solute contained therein is vaporized and the liquid absorbent is further reconcentrated, separating the vaporized solute from the resultant stream of reconcentrated liquid absorbent, and withdrawing the stream of reconcentrated liquid absorbent.

It is therefore, a general object of the present invention to provide an improved method and system for reconcentrating solute-rich liquid absorbent.

A further object of the present invention is the provision of a method of reconcentrating temperature sensitive solute-rich liquid absorbent wherein the liquid absorbent is partially reconcentrated by the application of heat at super-atmospheric pressure and then further reconcentrated by subjecting the partially reconcentrated liquid absorbent to sub-atmospheric pressure so that a high degree of reconcentration is obtained without bringing about decomposition of the liquid absorbent.

Yet a further object of the present invention is the provision of a system for reconcentrating a stream of solute-rich liquid absorbent wherein the liquid absorbent is subjected to sub-atmospheric pressures which is economical to install and operate.

Other and further objects, features and advantages of the present invention will be readily apparent to those skilled in the art upon a reading of the description of preferred embodiments of the invention which follows when taken in conjunction with the accompanying drawings.

BRIEF DESCRIPTION OF THE DRAWINGS

FIG. 1 is a diagrammatic view of a system for removing absorbable components from a gas stream which includes a system of the present invention for reconcentrating solute-rich liquid absorbent, and FIG. 2 is a detailed diagrammatic illustration of the system for reconcentrating solute-rich liquid absorbent of FIG. 1.

DESCRIPTION OF PREFERRED EMBODIMENTS

Referring to the drawings and particularly to FIG. 1, a system for removing absorbable components for a gas stream, for example, water vapor from a gas stream, is illustrated and generally designated by the numeral 10. The system 10 includes a conventional vapor-liquid contactor or absorber 12 and a system for reconcentrating solute-rich liquid absorbent of the present invention generally designated by the numeral 14. The absorber 12 functions to bring about intimate contact between a stream of liquid absorbent and the gas stream being processed and includes a plurality of conventional vapor-liquid contact trays, packing material or other means for causing intimate contact between liquid passing downwardly therethrough and gas passing upwardly.

The gas stream containing absorbable components enters the absorber 12 by way of an inlet conduit 16 attached to the bottom portion thereof, flows upwardly through the absorber and then exits by way of a conduit 18 attached to the top portion of the absorber. Solute-lean liquid absorbent enters the top portion of the absorber 12 by way of a conduit 20 connected thereto, passes downwardly through the absorber in intimate contact with the gas stream passing upwardly therein and the resulting solute-rich liquid absorbent exits the bottom portion of the absorber by way of a conduit 22 connected thereto. The term "solute-rich liquid absorbent" is used herein to mean liquid absorbent which is relatively loaded with one or more absorbable components. Absorbed components are collectively referred to herein as "solute." Solute-rich liquid absorbent which has been reconcentrated, i.e. a portion of the solute removed therefrom, is referred to herein as "solute-lean liquid absorbent".

Referring still to FIG. 1, the solute-rich liquid absorbent withdrawn from the absorber 12 by way of the conduit 22 passes through a heat exchanger (not shown) disposed within a reconcentrated liquid absorbent accumulator 24, and then flows by way of a conduit 26 to a still column 28 attached to a heated reboiler 30. While flowing through the still column 28 and reboiler 30, the solute-rich liquid absorbent is heated so that a portion of the solute contained therein is vaporized, separated and removed therefrom by way of a conduit 32 attached to the still column 28. The resulting partially reconcentrated liquid absorbent exits the reboiler 30 by way of a conduit 34 which is connected to a vapor-liquid separator 36. A liquid level control assembly 38 is provided connected to the reboiler 30 and the conduit 34 for controlling the level of liquid absorbent within the reboiler 30 and maintaining a super-atmospheric pressure condition within the reboiler 30 and still column 28.

The vapor-liquid separator 36 is operated at sub-atmospheric pressure and as the stream of partially reconcentrated liquid absorbent flows therethrough, additional solute contained therein is vaporized. The resulting reconcentrated liquid absorbent exits the separator 36 by way of a conduit 40 connected thereto and flows into the reconcentrated liquid absorbent accumulator 24. While passing through the accumulator 24 the reconcentrated liquid absorbent is cooled and then flows by way of a conduit 42 to a conventional pump 44. From the pump 44, a stream of reconcentrated or solute-lean liquid absorbent is pumped to the upper portion of the absorber 12 by way of the conduit 20.

The solute vaporized in the vapor-liquid separator 36 exits the separator 36 by way of a conduit 46 and preferably flows to the bottom portion of a sub-atmospheric pressure contactor 48. The contactor 48 is connected to a conventional vacuum pump 50 by a conduit 52 which functions to evacuate the separator 36 and contactor 48 so that a sub-atmospheric pressure condition is maintained therein.

A portion of the reconcentrated liquid absorbent not flowing into the conduit 20 from the pump 44 is caused to flow by way of the conduit 54 to the upper portion of the contactor 48. The vaporized solute entering the bottom portion of the contactor 48 flows upwardly therethrough into intimate contact with the solute-lean liquid absorbent flowing downwardly therein. The resultant solute-rich liquid absorbent accumulating in the bottom portion of the contactor 48 is withdrawn therefrom by way of a conduit 56. The conduit 56 is connected to the suction of a conventional pump 58 which pumps the absorbent by way of a conduit 60 to the still column 28 where it combines with the solute-rich liquid absorbent flowing to the still column 28 by way of the conduit 26. As illustrated in FIG. 1, a portion of the processed gas stream exiting the absorber 12 can be routed by way of a conduit 62 to the reboiler 30 wherein it is utilized as fuel.

As will be understood by those skilled in the art, the system 10 includes a variety of conventional temperature, pressure and level controllers (not shown) which function in a conventional manner to maintain the desired operating conditions in the system 10.

Referring now to FIG. 2, the system 14 of the present invention for reconcentrating solute-rich liquid absorbent is illustrated in greater detail. Solute-rich liquid absorbent enters the system 14 by way of the conduit 22 and flows through a heat exchange coil 64 disposed within the accumulator 24 below the level of hot reconcentrated liquid absorbent maintained therein. From the heat exchange coil 64 the preheated solute-rich liquid absorbent passes by way of the conduit 26 into the still column 28 and reboiler 30. The reboiler 30 includes a conventional fire box 66 disposed in the forward portion thereof and a conventional fuel gas burner 68 is attached to one end of the firebox. A stack 70 for removing spent products of combustion is attached to the other end of the fire box. Fuel is provided to the burner 68 by way of the previously described conduit 62 connected thereto.

The reboiler 30 includes a transverse baffle 72 disposed in the lower portion thereof positioned rearwardly of the fire box 66 so that a body of liquid absorbent 74 is maintained in the forward portion of the reboiler 30 at a level above the fire box 66. A vertically positioned siphon 76 is disposed within the rearward portion of the reboiler 30. The siphon 76 is attached to an outlet connection 78 provided in the reboiler 30 and the conduit 34 previously described is attached to the connection 78 and to the inlet connection of the vapor-liquid separator 36. The liquid level control 38 is conventional in design and includes a float member 80 disposed within the rearward portion of the reboiler 30 which is operably connected to a convention level controller 82 by way of a connection 84 provided in the reboiler 30. A conventional level control valve 86 is disposed in the conduit 34 and is operably connected to the liquid level controller 82. As will be understood, the liquid level control assembly 38 functions to control the level of a body of liquid absorbent 88 within the rearward portion of the reboiler 30. That is, the liquid level control assembly 38 maintains the level of the body of liquid absorbent 88 above the open end of the siphon 76 so that only liquid absorbent is caused to flow by way of the conduits 76 and 34 to the vapor-liquid separator 36 and the super-atmospheric vapor pressure within the reboiler 30 and still column 28 is prevented from comunicating with the separator 36.

The separator 36 and contactor 48 are maintained at a sub-atmospheric pressure by the vacuum pump 50. The stream of partially reconcentrated liquid absorbent flowing into the separator 36 is subjected to the subatmospheric pressure condition therein causing it to be further reconcentrated and then it flows from the separator 36 by way of the conduit 40 to the accumulator 24. A body of reconcentrated liquid absorbent 90 is maintained within the accumulator 24 above the heat exchange coil 54 disposed therein. From the accumulator 24 the reconcentrated liquid absorbent flows by way of the conduit 42 to the pump 44.

In operation of the system 14, the stream of solute-rich liquid absorbent enters the system by way of the conduit 22, passes through the heat exchange coil 64 wherein it is preheated and then flows by way of the conduit 26 to the still column 28. The still column 28 is conventional in design and contains packing material or trays 29 for bringing about intimate contact between the stream of solute-rich liquid absorbent passing downwardly therein and the absorbent and solute vapors passing upwardly therein. This contact between the relatively cool rich liquid absorbent and the hot rising vapors functions to bring about the condensation and recovery of vaporized liquid absorbent which would otherwise escape the reboiler 30. The solute vapors generated in the reboiler 30 flow through the still column 28 and exit by way of the conduit 32 attached thereto. From the conduit 32 the solute vapors may be vented to the atmospheric or conducted to a point of further processing.

Heat generated by the combustion of fuel in the burner 68 is transferred from the combustion gases passing through the fire box 66 to the body of liquid absorbent 74 contained within the reboiler 30 causing the vaporization of solute contained in the liquid absorbent and the vaporization of some liquid absorbent as described previously. The partially reconcentrated liquid absorbent produced in the forward portion of the reboiler 30 flows from the body 74 thereof over the baffle 72 and into the body 88 thereof. From the body 88, the partially reconcentrated liquid absorbent flows through the conduit 76, the conduit 34 and the liquid level control valve 86 into the separator 36. As will be understood, the conduit 32 attached to the still column 28 can be led directly to the atmosphere so that the still column 38 and reboiler 30 operate at a pressure level substantially equal to atmospheric pressure or a back pressure controller may be disposed in the conduit 32 so that the still column 28 and reboiler 30 operate at a desired higher pressure. Preferably, the still column 28 and reboiler 30 are operated at a super-atmospheric pressure which is substantially equal to atmospheric pressure so that the still column 28 and reboiler 30 are of conventional low pressure design.

The stream of hot partially reconcentrated liquid absorbent enters the separator 36 wherein it is subjected to a sub-atmospheric pressure condition. As is well understood by those skilled in the art, the change in pressure over the liquid absorbent as it flows through the separator 36 causes additional solute to be vaporized thereby further reconcentrating the stream of liquid absorbent. The resulting reconcentrated liquid absorbent exits the separator 36 by way of the conduit 40, flows through the accumulator 24 wherein it is cooled, and then is pumped through the conduit 20 by the pump 44.

The solute vapors produced in the separator 36 exit by way of the conduit 46 and pass into the bottom portion of the contactor 48. While flowing upwardly within the contactor 48, the solute vapors and any associated vaporized liquid absorbent are contacted by a stream of relatively cool solute-lean liquid absorbent passing downwardly therein and are cooled and absorbed thereby. In this manner, the contactor 48 functions to bring about the condensation and recovery of vaporized liquid absorbent (which would otherwise be lost) and to reduce the quantity of solute vapors passing through the conduit passing through the conduit 52 into the vacuum pump 50 thereby reducing the size of the vacuum pump 50 required. The solute-rich liquid absorbent accumulating within the bottom portion of the contactor 48 is withdrawn by way of the conduit 56 and 60 and is returned to the still column 28 by the pump 58 wherein it is combined with the solute-rich liquid absorbent flowing therein from the conduit 26. Thus, by returning the solute vapors to the still column 28 from the contactor 48 they are discharged from the system 14 by way of the solute vapor outlet 32. While contacting the solute vapors with a cool lean liquid absorbent in the contactor 48 is presently preferred for cooling and condensing the solute and absorbent vapors, as will be readily understood by those skilled in the art other methods and apparatus can be used such as cooling and condensing the vapors in a heat exchanger, etc.

The stream of solute-lean liquid absorbent flowing to the contactor 48 by way of the conduit 54 is a small continuous side stream of the reconcentrated liquid absorbent flowing through the conduit 20. A control valve 92 is disposed within the conduit 54 for controlling the flow rate of reconcentrated liquid absorbent passed to the contactor 48.

Thus, it can be seen that by the present invention the reconcentration of a stream of solute-rich liquid absorbent is accomplished by first heating the liquid absorbent at super-atmospheric pressure to partially reconcentrate it and then subjecting the partially reconcentrated liquid absorbent to sub-atmospheric pressure conditions so that it is further reconcentrated. The system of the present invention utilizes conventional equipment except for the separator 36 and contactor 48 which are the only parts of the system subjected to the sub-atmospheric pressure. Because the still column and reboiler are conventional in design, i.e., do not have to be designed for full vacuum operation, the system of the present invention has a low cost as compared to heretofore used vacuum regeneration systems. Further, the present invention is well adapted to carry out the objects mentioned above as well as those inherent therein. While presently preferred embodiments of the invention have been described herein for purposes of disclosure, numerous changes in the details relating to the arrangement of parts and steps can be made which will readily suggest themselves to those skilled in the art, and which are encompassed within the spirit of the invention disclosed herein.

What is claimed is:

1. A method of reconcentrating a stream of solute-rich liquid absorbent comprising the steps of:
   (a) heating the stream of solute-rich liquid absorbent at super-atmospheric pressure to vaporize a portion of the solute contained therein;
   (b) separating the vaporized solute from the liquid absorbent;
   (c) subjecting the resultant stream of partially reconcentrated liquid absorbent to sub-atmospheric pressure so that additional solute contained therein is vaporized and the liquid absorbent is further reconcentrated;
   (d) separating the vaporized solute from the resultant stream of reconcentrated liquid absorbent;
   (e) withdrawing the stream of reconcentrated liquid absorbent;
   (f) contacting the separated vaporized solute of step (d) with a stream of relatively cool solute-lean liquid absorbent so that the solute vapor and any associated vaporized absorbent are condensed and absorbed in said lean absorbent; and
   (g) combining the resultant stream of solute-rich liquid absorbent with the stream of solute-rich liquid absorbent of step (a).

2. The method of claim 1 wherein the stream of solute-lean liquid absorbent is a portion of the withdrawn reconcentrated liquid absorbent of step (e).

3. The method of claim 2 which is further characterized to include the step of passing the stream of solute-rich liquid absorbent to be reconcentrated in heat exchange relationship with the stream of reconcentrated liquid absorbent of step (e) prior to carrying out step (a).

4. The method of claim 3 wherein the liquid absorbent is an aqueous glycol solution and the solute is water.

5. A method of reconcentrating a stream of water-rich liquid absorbent comprising the steps of:
  (a) heating said stream of water-rich liquid absorbent at super-atmospheric pressure to vaporize a portion of the water contained therein;
  (b) separating the vaporized water from the resultant partially reconcentrated stream of liquid absorbent;
  (c) subjecting the partially reconcentrated stream of liquid absorbent to sub-atmospheric pressure so that additional water contained therein is vaporized and the stream of liquid absorbent is further reconcentrated;
  (d) separating the vaporized water from the resultant stream of reconcentrated liquid absorbent;
  (e) withdrawing the stream of reconcentrated liquid absorbent;
  (f) contacting the separated vaporized water of step (d) with a stream of relatively cool water-lean liquid absorbent so that the vaporized water and any associated absorbent vapor are condensed and absorbed therein; and
  (g) combining the resultant stream of water-rich liquid absorbent with the stream of water-rich liquid absorbent of step (a).

6. The method of claim 5 wherein the stream of water-lean liquid absorbent is a portion of the withdrawn reconcentrated liquid absorbent of step (e).

7. The method of claim 6 which is further characterized to include the step of passing the stream of water-rich liquid absorbent to be reconcentrated in heat exchange relationship with the stream of reconcentrated liquid absorbent of step (e) prior to carrying out step (a).

8. The method of claim 7 wherein the liquid absorbent is an aqueous triethylene glycol solution.

9. A system for reconcentrating a stream of solute-rich liquid absorbent which comprises:
  a heated reboiler to vaporize a portion of the solute contained in said stream of solute-rich liquid absorbent at super-atmospheric pressure thereby partially reconcentrating said liquid absorbent, said reboiler having a solute-rich liquid absorbent inlet connection, a vaporized solute outlet connection and a partially reconcentrated liquid absorbent outlet connection;
  a vapor-liquid separator for subjecting said stream of partially reconcentrated liquid absorbent to sub-atmospheric pressure so that additional solute contained therein is vaporized and said stream of liquid absorbent is further reconcentrated, said separator having a partially reconcentrated liquid absorbent inlet connection, a solute vapor outlet connection and a reconcentrated liquid absorbent outlet connection;
  conduit means connected between the partially reconcentrated liquid absorbent outlet connection of said heated reboiler and the inlet connection of said separator;
  a vapor-liquid contactor having a solute vapor inlet connection, a solute vapor outlet connection, a solute-lean liquid absorbent inlet connection and a solute-rich liquid absorbent outlet connection;
  conduit means connected between the vapor outlet connection of said separator and the solute vapor inlet connection of said contactor;
  a vacuum pump;
  conduit means connected between the solute vapor outlet connection of said contactor and said vacuum pump; and
  conduit means connected between the solute-rich liquid absorbent outlet connection of said contactor and the solute-rich liquid absorbent inlet connection of said heated reboiler.

10. The system of claim 9 which is further characterized to include:
  a reconcentrated liquid absorbent accumulator having both an inlet connection and an outlet connection for reconcentrated liquid absorbene; and
  conduit means connected between the reconcentrated liquid absorbent outlet connection of said vapor-liquid separator and the inlet connection of said accumulator.

11. The system of claim 10 which is further characterized to include:
  a heat exchanger for exchanging heat between reconcentrated liquid absorbent in said accumulator and the stream of solute-rich liquid absorbent to be reconcentrated, said heat exchanger being disposed within said accumulator and having an inlet connection for receiving the stream of solute-rich liquid absorbent and an outlet connection therefore; and
  conduit means connected between the heat exchanger outlet connection and said heated reboiler solute-rich liquid absorbent inlet connection.

12. The system of claim 11 which is further characterized to include:
  means for pumping the stream of reconcentrated liquid absorbent from said accumulator; and
  conduit means connected between the outlet connection of said accumulator and said pumping means.

13. The system of claim 12 which is further characterized to include:
  conduit means connected between the means for pumping said stream of reconcentrated liquid absorbent and the solute-lean liquid absorbent inlet of said contactor.

References Cited
UNITED STATES PATENTS

| | | | |
|---|---|---|---|
| 3,370,636 | 2/1968 | Francis, Jr. et al. | 55—32 X |
| 3,630,262 | 12/1971 | Macek | 159—17 VS |
| 3,648,434 | 3/1972 | Gravis III et al. | 55—32 |
| 2,941,873 | 6/1960 | Brown et al. | 159—17 VS X |

JACK SOFER, Primary Examiner

U.S. Cl. X.R.

159—31; 55—32; 203—12, 39, 40, 42

PO-1050
(5/69)

UNITED STATES PATENT OFFICE
CERTIFICATE OF CORRECTION

Patent No. 3,824,177     Dated July 16, 1974

Inventor(s) Joseph D. Honerkamp and Paul M. Tournoux

It is certified that error appears in the above-identified patent and that said Letters Patent are hereby corrected as shown below:

Column 4, line 4, "not" should be deleted.

Column 5, line 23, "atmospheric" should be --atmosphere--.

Claim 9, line 60, after the second use of the word "connection", the following words should be inserted: --a vapor outlet connection,--.

Claim 10, line 18, "absorbene" should be --absorbent--.

Claim 11, line 31, "therefore" should be --therefor--.

Signed and sealed this 8th day of October 1974.

(SEAL)
Attest:

McCOY M. GIBSON JR.
Attesting Officer

C. MARSHALL DANN
Commissioner of Patents